United States Patent [19]

Liu

[11] Patent Number: 4,727,299
[45] Date of Patent: Feb. 23, 1988

[54] AUTO-ROCKING APPARATUS WITH NON-FIXED SUPPORTING POINTS

[76] Inventor: Kuo A. Liu, No. 334-8, Pao Shan Road, Hsinchu City, Taiwan

[21] Appl. No.: 922,535

[22] Filed: Oct. 23, 1986

[51] Int. Cl.$^4$ .............................................. H02K 41/00
[52] U.S. Cl. ................................... 318/128; 318/132; 310/36; 446/484
[58] Field of Search ................ 446/484; 318/127–132; 310/36–39

[56] References Cited

U.S. PATENT DOCUMENTS 2,770,073 11/1956 Sullivan ........................... 446/484 X
3,360,703 12/1967 Reich ................................... 318/128
4,554,473 11/1985 Müller .............................. 310/68 X Primary Examiner—Donovan F. Duggan
Attorney, Agent, or Firm—Poms, Smith, Lande & Rose

[57] ABSTRACT

An apparatus comprising a rocker with a curved base, and an activating base supporting and continuously activating the rocker. Two magnets, whose north poles point in opposite directions, one upward and the other downward, are respectively disposed on either side, towards which rocker rocks, of the center of gravity of the curved base. A first induction coil is set within the activating base and under the rocker so as to produce induced a current when the rocker is rocking in the direction of one of the two magnets. An operational amplifier integrated circuit (OP AMP IC) is provided within the activating base so as to amplify the induced current. A second induction coil, which is connected to the output of the OP AMP IC, is provided so as to induce a magnetic field. This magnetic field applies an attractive force on the magnet when it moves closer to the activating base, and a repelling force on the other magnet moving away from the activating base so as to activate the rocking means.

3 Claims, 9 Drawing Figures

AUTO-ROCKING APPARATUS WITH NON-FIXED SUPPORTING POINTS

BACKGROUND OF THE INVENTION

The present invention relates to an auto-rocking apparatus with non-fixed supporting points, wherein a rocking means with a curved base can be continuously activated by an activating base comprising an electromagnetic activating means.

There exist a great deal of rocking toys or apparatus in the markets all over the world. Most of them are designed as decorations or playthings. The rocking motions of those rocking toys or apparatus are usually driven by small motors, springs, elastic belts, etc. via mechanical transmission elements. However, the above-mentioned conventional rocking apparatus are subject to go out of order, due to their complicated structures, so as to fail to continuously rock over a long period of time. On the other hand, some rocking apparatus have simple structures which are activated either by gravitational force equilibrating the rocking means, or by wind power. Nevertheless, these existing rocking apparatus fail to be able to rock or oscillate over a prolonged period of time for lack of a continuous activation means. In recent years, some auto-oscillating apparatus which are supported on some specific stationary positions thereof are designed to be continuously activated by magnetic induction circuits so as to automatically oscillate on the specific support means. Since all the auto-oscillating apparatus presently available on the market require specific stationary supporting means which serve as stationary fulcrums or supporting points, both the structure and the oscillation pattern of the autooscillating apparatus with stationary supporting points are quite restricted.

It is the purpose of the present invention, therefore, to mitigate and obviate the above-mentioned drawbacks in the manner set forth in the detailed description of the preferred embodiment.

SUMMARY

A primary objective of the present invention is to provide an auto-rocking apparatus with non-fixed supporting points wherein the rocker with a curved base can continuously rock on an activating base.

Another objective of the present invention is to provide an auto-rocking apparatus with non-fixed supporting points, wherein the top face of the activating base is provided with a circular recess so as to restrict the auto-rocking apparatus to rocking within the recess.

Still another objective of the present invention is to provide an auto-rocking apparatus with non-stationary supporting points, such that when the rocking means is rocking towards either side of the two magnets disposed thereon, the electromagnetic activating means simultaneously applies an attractive force on one magnet moving vertically closer to it, and applies a repelling force on the other magnet moving vertically away from it.

A further objective of the present invention is to provide an auto-rocking apparatus, wherein the rocking means is alternately provided with a decorative boat hull so as to enable the rocking means to rock on water stored in the upper housing of the activating base.

Further objectives and advantages of the present invention will become apparent as the following description proceeds, and the features of novelty which characterize the invention be pointed out with particularity in the claims annexed to and forming a part of this invention.

DETAILED DESCRIPTION OF THE PREFERRED EMBODIMENT

Figure 1:
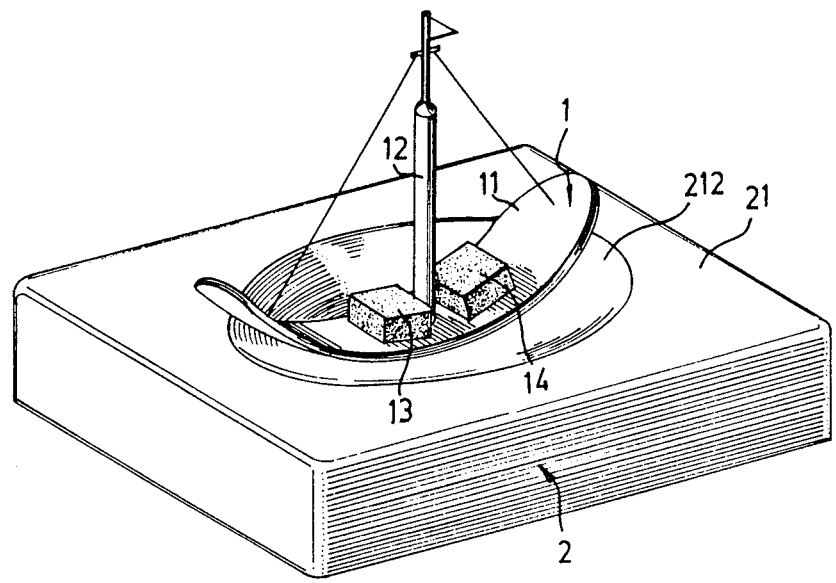
FIG. 1 is a perspective view of the present invention.
Figure 2:
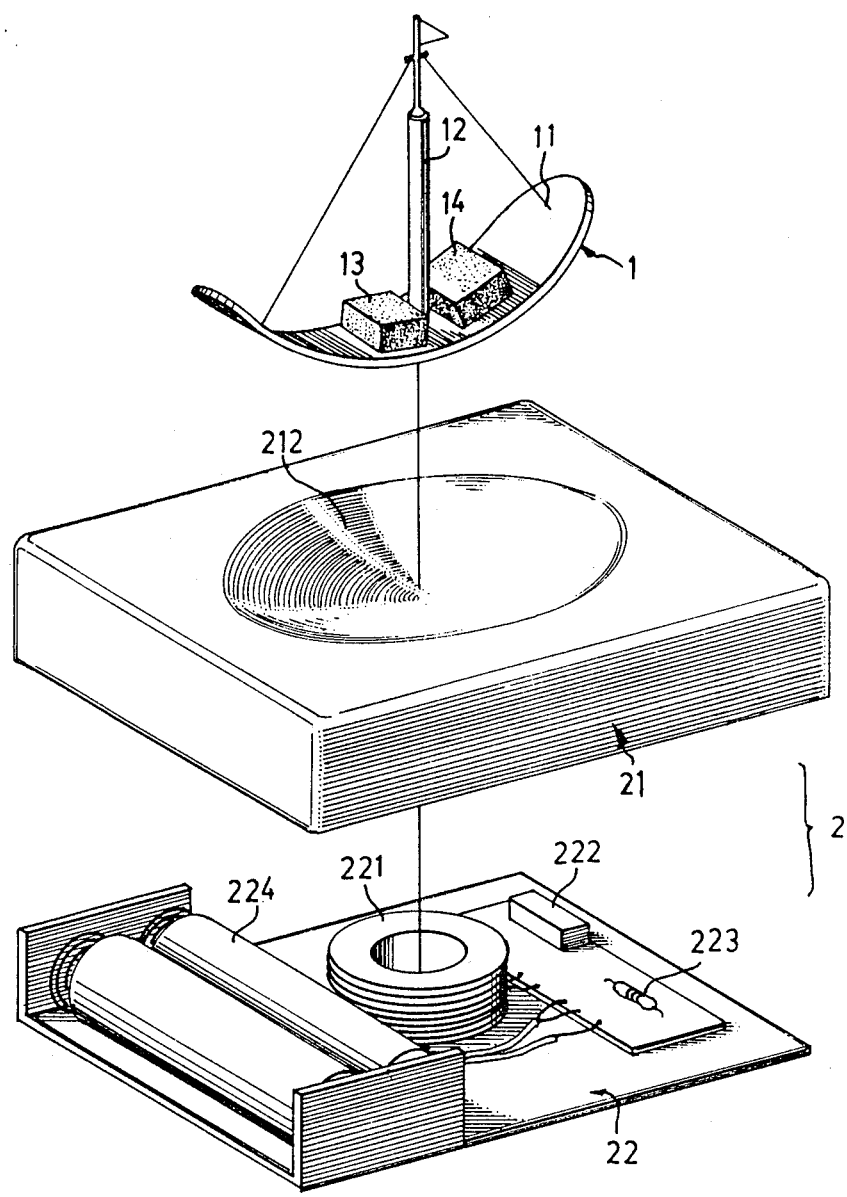
FIG. 2 is an exploded view of the present invention.

Referring to FIGS. 1 and 2, it can be seen that an auto-rocking apparatus with non-fixed supporting points, comprises a rocker 1 capable of rocking on the bottom of the curved surface thereof and an activating base 2 which supports and activates the rocker 10 thereon.

The rocker 1 comprises a curved rocking base 11 with both ends thereof curving upwards, an ornamental means 12 for decorating the rocker 1, and two permanent magnets 13 and 14 disposed on the rocking base 11. The curved rocking base 11 forms the base of the rocker 1 and enables the rocker 1 to rock on it. The curvature of the rocking base 11 will not be specified as this can be optionally determined according to the desired rocking motion. An ornamental pointed column 12 is vertically disposed on the center of the top surface of the curved rocking base 11 (substantially at the center of gravity of the rocker 1). Two permanent magnets 13 and 14 are respectively disposed one on either side, towards which the rocker 1 rocks, of the pointed column 12 of the rocking base 11. The two magnets 13 and 14 are arranged such that the N (north) magnetic pole of the left-hand magnet 13 faces the rocking base 11 and meanwhile the S (south) magnetic pole of the right-hand magnet 14 faces the rocking base 11. It is noteworthy that the two magnets 13 and 14 must always be arrayed such that the magnetic poles thereof facing towards the rocking base 11 are opposites (one is an N pole and the other is an S pole). Accordingly, the magnets 13 and 14 are interchangable if each of them keeps the above-described orientations. The magnets 13 and 14 should be set as close as practically possible to the center of gravity (CG) of the rocker 1, assuming the CG of the rocking base is directly above the center, for better magnetic induction effect.

The activating base 2 comprises a square upper housing 21 supporting the rocker 1 thereon, a lower housing 22, and an electromagnetic activating means disposed within the lower housing 22 for activating the rocker 1. A circular recess 212, which slopes down slightly from the peripheral edge to the center thereof, is set on the center of the top face of the upper housing 21. The surface of the bottom face of the rocker 1 and that of the recess 212 of the upper housing 21 are preferably smooth for less frictional energy loss over an extended period of time. The lower housing 22 is arranged so as to enable the upper housing 21 to be securably disposed on the lower housing 22, and to enable the electromagnetic activating means to be contained within the lower housing 22.

Figure 3:
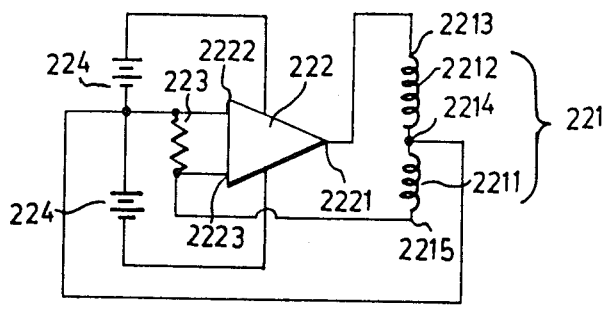
FIG. 3 is the electrical circuit diagram of the present invention.
Figure 4:
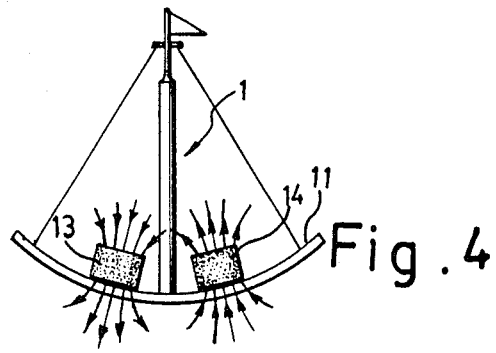
FIG. 4 is an elevational view of the rocker of the present invention, wherein the directions of the lines of force of two magnets disposed on the rocker can be clearly seen.

The electromagnetic activating means comprises an induction coil set 221 disposed on the lower housing 22 and centered under the circular recess 212, an operational amplifier integrated circuit (OP AMP IC) 222, a resistor 223, and dry cells 224 or other power supplying means. Referring further to FIG. 3, the configuration of the circuit of the electromagnetic activating means can be clearly seen. The induction coil set 221 consists of two specific coils, 2211 and 2212, which are coaxial and disposed together, with one end of the coil 2211 connecting to one end of the coil 2212. The coils, 2211 and 2212, have opposite windings, one of which is clockwise and the other of which is counterclockwise. The output terminal 2221 of the OP AMP IC 222 connects to one end 2213 of the second induction coil 2212 and each of the two input terminals, 2222 and 2223, thereof respectively connects to the common end 2214 of the second induction coil 2212 and the first induction coil 2211, and the other end 2215 of the first induction coil 2211. In this embodiment, the terminal 2222 of the OP AMP IC 222 is an inverting terminal. The ends of the resistor 223 connect to the two input terminals of the OP AMP IC 222. It is noted that if the coils 2211 and 2212 were would in same direction, the input terminal 2222 would then be a non-inverting terminal.

Figures 5, 6:
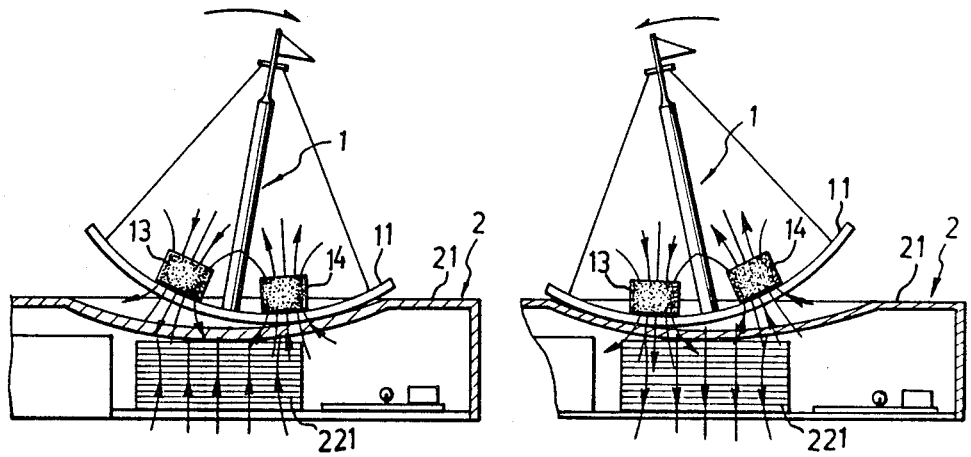
FIG. 5 is an elevational partially cut-away view of the present invention, wherein the rocker is rocking to the left.
FIG. 6 is an elevational partially cut-away view of the present invention, wherein the rocker is rocking to the right.

Referring to FIGS. 3 to 6, it can be seen how the rocker 1 is continuously activated by the electromagnetic activating means disposed in the activating base 2. Since the N pole of the magnet 13, faces to where it is disposed (substantially downward), the vector directions of the lines of force thereof are substantially toward the bottom of the rocking base 11 (see FIG. 4). Similarly, the vector directions of the lines of force of magnet 14 are substantially remote from the rocking base 11 (substantially upward) because the N pole of the magnet 14 faces substantially to the tip of the ornamental column 12. If the rocker 1 is given an initial manual push, it is continuously activated by the electromagnetic means inside the activating base 2 so as to automatically rock until the dry cells 224 run out. When the rocker 1 is rocking toward the left-hand side thereof (as shown in FIG. 5), magnet 13 would become vertically closer to the coil set 221 while magnet 14 becomes more vertically remote from the coil set 221. Then, the magnetic flux with the lines of force pointing downward, which is emitted by the magnet 13 and which passes through the first conduction coil 2211 of the coil set 221, would increase. Simultaneously, the magnetic flux with its lines of force pointing downward passing through the first conduction coil 2211 would also increase because the magnetic flux emitted by the magnet 14 with its lines of force pointing upward therefrom decreases. Since the total magnetic flux with its lines of force pointing downward passing through the induction coil 2211 increase, an induction current would thereby be formed in accordance with Faraday's Law. When the current flows into the OP AMP IC which is actuated by the power supplied by the dry cells 224, it would be amplified and transmitted to the second induction coil 2212 of the induction coil set 221. Because the amplified current passes through the second induction coil 2212 which is wound oppositely to the first induction coil 2211, an induced magnetic field which emits the lines of force pointing downwards is created. The induced magnetic field with lines of force pointing downward, which is created by the amplified current, would substantially attract the magnet 13 which emits lines of force pointing in the same direction, and repel the magnet 14 which emits lines of force pointing in the opposite direction. Therefore, there always exists an attractive force against the left-hand magnet 13 and a repellent force against the right-hand magnet 14 while the rocker 1 is rocking leftward. When the rocker 1 reaches its dead left rocking position, it starts to rock back to the right. During the rightward rocking of the rocker 1 (see FIG. 6), the magnetic flux which passes through the induction coil 2211 with its lines of force pointing upwards increases because the magnet 14 which emits the lines of force pointing upwards becomes closer to the induction coil 2211 and the magnet 13 which emits the lines of force pointing downwards becomes more distant from the first induction coil 2211. Then, an induction current, whose direction is opposite to that of the current created through the first induction coil 2211 when the rocker 1 is rocking towards left as described hereinbefore, is created through the first induction coil 2211. The induction current subsequently passes through, and is amplified by, the OP AMP IC 222. The amplified current emitted from the OP AMP IC 222 then creates a magnetic field with its lines of force pointing upwards. The magnetic field with its lines of force pointing upwards will then attract magnet 14 because its lines of force also point upwards, and simultaneously repel magnet 13 because its lines of force oppositely point downwards. Accordingly, it is clear that there is always an attracting magnetic force applied on magnet 14 while a repelling magnetic force is applied on magnet 13 during the period that the rocker 1 is rocking to the right. It is noted that the aforedescribed attracting and repelling forces, which are emitted from the second induction coil 2212, are alternately applied on the magnets 13 and 14 in accordance with the alternately rightward and leftward rocking of the rocker 1. It can also be said that the coexistent attracting and repelling magnetic forces are always synchronous with either the rightward rocking motion or the leftward rocking motion. The frequency of the magnetic forces applied on the magnets 13 and 14 is then always the same as that of the oscillation of the rocker 1 so as to produce the resonance phenomenon. Since the resonance phenomenon exactly or substantially exists between the oscillation of the rocker 1 and the alternate magnetic forces, only a slight amount of current is then required in the present invention to make up the frictional losses between the rocker 1 and the upper housing 21. Thus, a few dry cells can supply energy for a long period of oscillation of the rocker 1.

Figure 7:
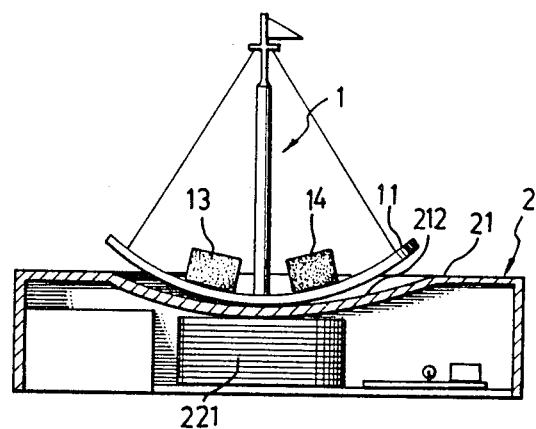
FIG. 7 is an elevational view of the present invention, wherein the rocker resides on the middle of the circular recess on the upper housing.
Figure 8:
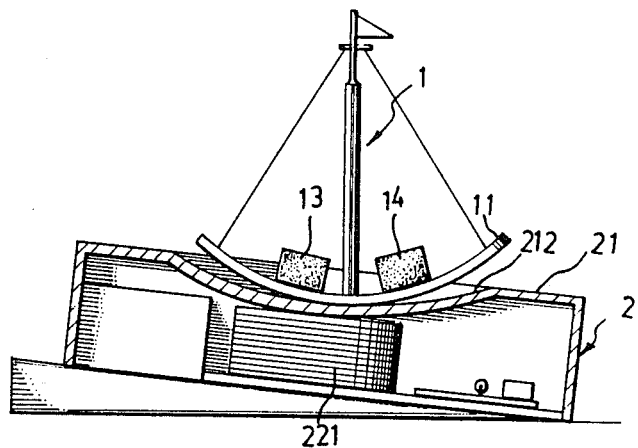
FIG. 8 is an elevational view of the present invention, showing how the rocker stays in the recess even when the activating base is tilted.

Referring further to FIGS. 7 and 8, it can be seen that since the rocker 1 rocks within the circular recess 212, the center of the curved rocking base 11 is tends to locate on the center of the circular recess 212. It is improbable that the rocker 1 will rock out of the circular recess 212, even when the activating base 2 is somewhat tilted (see FIG. 8). The shape of the recess set on the top face of the upper housing can be optionally determined in accordance with specific purposes. For instance, an elliptic recess can restrain the rocker to rock only in the lengthwise directions thereof.

Figure 9:
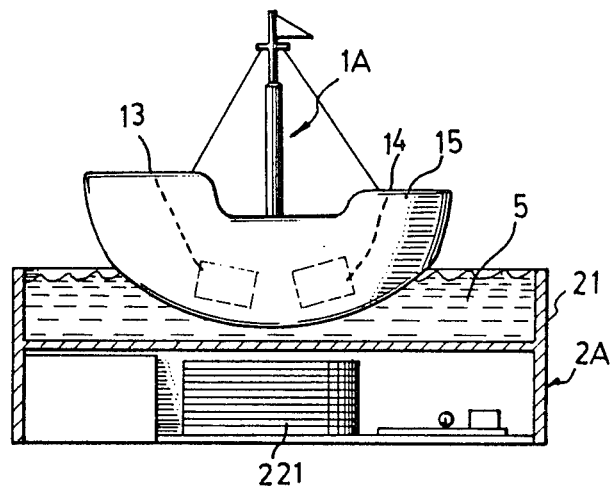
FIG. 9 is an elevational view of another embodiment of the present invention, wherein the rocker is provided with a decorative boat hull so as to be able to rock on water stored in the upper housing of the activating base.

Referring to FIG. 9, a second embodiment of the present invention can be seen. The rocker 1, which has a curved rocking base 11 in the first embodiment, has been changed into a rocking boat 1A with a round hull 15 which is suitable for rocking on water. The upper housing 21 has also been adopted so that the peripheral wall is provided for storing water therein. All other elements and parts are the same as those adopted and described in the first embodiment. Therefore, the second embodiment, shown in FIG. 9, can continuously rock on the water stored in the activating base 2A in the same manner as aforedescribed in the embodiment shown in FIGS. 1 to 8.

It is noteworthy that any rocking means suitable for rocking can be adopted to replace the rocker 1 and the rocking boat 1A. It is also noteworthy that the two permanent magnets adopted in the above preferred embodiment can be replaced by a single permanent magnet disposed on either side of the rocking means. However, in this case, there is only a magnetic force, attractive or repelling, applied on the rocker instead of two magnetic forces, attractive and repelling, simultaneously applied on the rocking means.

As various possible embodiments might be made of the above invention, and as various adaptations might be made in the embodiment above set forth, it is to be understood that all matter herein described or shown in the accompanying drawings is to be interpreted as illustrative and not in a limiting sense. Thus it will be appreciated that the drawings are exemplary of a preferred embodiment of the invention.

I claim:

1. An auto-rocking apparatus with non-fixed supporting points comprising:
   (a) a rocking means with a curved rocking base for said rocking means to rock thereon; said rocking means being provided on either side with two permanent magnets, said two permanent magnets being arranged in such a manner that a first north pole of one end thereof substantially points upwards and a second north pole of another end thereof substantially points downwards;
   (b) a supporting means with a circular or an elliptical recess on a top face thereof for said rocking means to stably rock thereon with contact points therebetween non-fixed; and
   (c) electromagnetic activating means comprising an induction coil set disposed under said supporting means and consisting of a first induction coil and a second induction coil connecting to said first induction coil; said first induction coil being coaxial with said second induction coil;
   an operational amplifier integrated circuit wherein an output terminal thereof connects to one end of said second induction coil, and one of two input terminals thereof respectively connects to one common end of said second induction coil and said first induction coil, and another of the two input terminals thereof connects to another end of said first induction coil;
   a resistor connecting to two input terminals of said operational amplifier integrated circuit; and
   power supplying means connecting to said integrated circuit.

2. An auto-rocking apparatus with non-fixed supporting points as set forth in claim 1, wherein said two permanent magnets are replaced by a single permanent magnet which is disposed on either side of said rocking means.

3. An auto-rocking apparatus with non-fixed supporting points as set forth in claims 1 or 2, wherein said curved base of said rocking means is semi-spherical.

* * * * *